US011626819B2

(12) United States Patent
Hossain et al.

(10) Patent No.: US 11,626,819 B2
(45) Date of Patent: Apr. 11, 2023

(54) MOTOR CONTROL SYSTEM AND METHOD FOR SELECTIVELY SHORTING MOTOR WINDINGS

(71) Applicant: MANDO CORPORATION, Gyeonggi-do (KR)

(72) Inventors: Shakil Hossain, Saginaw, MI (US); Lucas Ritter, Saginaw, MI (US); Awab Ali, Saginaw, MI (US); Tomy Sebastian, Saginaw, MI (US); Kade Hudson, Midland, MI (US)

(73) Assignee: HL MANDO CORPORATION, Gyeonggi-Do (KR)

( * ) Notice: Subject to any disclaimer, the term of this patent is extended or adjusted under 35 U.S.C. 154(b) by 8 days.

(21) Appl. No.: 16/833,437

(22) Filed: Mar. 27, 2020

(65) Prior Publication Data
US 2020/0321892 A1     Oct. 8, 2020

Related U.S. Application Data

(60) Provisional application No. 62/829,496, filed on Apr. 4, 2019.

(51) Int. Cl.
    *H02P 3/22*     (2006.01)
    *B62D 5/04*     (2006.01)
(52) U.S. Cl.
    CPC ............... *H02P 3/22* (2013.01); *B62D 5/046* (2013.01); *B62D 5/0463* (2013.01)
(58) Field of Classification Search
    CPC .......... H02P 3/22; B62D 5/046; B62D 5/0463
    (Continued)

(56) References Cited

U.S. PATENT DOCUMENTS 9,548,684 B1 *    1/2017    Cameron, Jr. ............ H02P 6/14
2002/0130631 A1   9/2002    Sebastian
                  (Continued)

FOREIGN PATENT DOCUMENTS

EP    0606746 A1 *    7/1994    ......... H03K 17/0826
EP    0 606 746       10/2001
                  (Continued)

OTHER PUBLICATIONS

International Search Report for PCT/KR2020/004528 dated Jul. 30, 2020.
(Continued)

*Primary Examiner* — Jorge L Carrasquillo
(74) *Attorney, Agent, or Firm* — Ladas & Parry, LLP

(57) ABSTRACT

A motor control system shorts motor windings of a motor by using junction gate field-effect transistors (JFETs) controlled bipolar junction transistors (BJTs), solid state relays (SSRs) controlled BJTs, and depletion mode metal-oxide-semiconductor field-effect transistors (MOSFETs) so that the motor generates braking torque when all or some electric control units of the motor are disabled or failed. The motor control system comprises: a motor comprising a plurality of motor phase terminals; a plurality of electric control units electrically connected with the motor and configured to control the motor, wherein the electric control units are configured to output control signals, respectively; and a shorting circuit connected to between the motor and the electric control units, the shorting circuit configured to short the motor phase terminals in response to receiving none of the control signals from the electric control units. The shorting circuit is configured not to short the motor phase terminals when receiving at least one of the control signals from at least one of the electric control units.

18 Claims, 8 Drawing Sheets

(58) Field of Classification Search
USPC .......................................................... 318/379
See application file for complete search history.

(56) References Cited

U.S. PATENT DOCUMENTS

| | | | |
|---|---|---|---|
| 2017/0201204 A1 | 7/2017 | Kawano et al. | |
| 2018/0129238 A1 | 5/2018 | Baranyai | |
| 2019/0052217 A1* | 2/2019 | Kim | H02P 29/024 |
| 2020/0028463 A1* | 1/2020 | Suzuki | B62D 5/0487 |
| 2021/0044245 A1* | 2/2021 | Okubo | B62D 5/0481 |

FOREIGN PATENT DOCUMENTS

| | | |
|---|---|---|
| JP | 2012-153355 | 8/2012 |
| JP | 5034824 | 9/2012 |
| JP | 5120532 | 1/2013 |
| KR | 10-1354100 | 1/2014 |
| KR | 10-2014-0071704 | 6/2014 |

OTHER PUBLICATIONS

Written Opinion of the International Searching Authority for PCT/KR2020/004528 dated Jul. 30, 2020.

\* cited by examiner

MOTOR CONTROL SYSTEM AND METHOD FOR SELECTIVELY SHORTING MOTOR WINDINGS

CROSS REFERENCE TO PARENT APPLICATION(S)

This application claims the benefit of U.S. patent application Ser. No. 62/829,496, filed on Apr. 4, 2019, entitled "SSR Controlled BJT; Depletion FET Controlled BJT; Low Side MOSFET Turn ON with Resistor; Depletion Mode MOSFET; Enhancement Mode MOSFET", which is all hereby incorporated herein by reference in its entirety.

CROSS REFERENCE TO RELATED PATENT APPLICATION(S)

This application is related to U.S. patent application Ser. No. 16/664,760, filed on Oct. 25, 2019, entitled "MOTOR CONTROL SYSTEM AND METHOD FOR SELECTIVELY SHORTING MOTOR WINDINGS", which is all hereby incorporated herein by reference in its entirety.

BACKGROUND

The present disclosure generally relates to a system, apparatus and method for controlling a motor. More specifically, some embodiments of the present disclosure relate to a motor control and method for selectively shorting motor winding such that braking torque can be produced by the motor.

Vehicles require a steering system to control the direction of travel. Previously, mechanical steering systems have been used. Mechanical steering systems typically include a mechanical linkage or a mechanical connection between a steering wheel and vehicle's road wheels. Thus, movement of the steering wheel causes a corresponding movement of the road wheels. Movement of such mechanical systems is often power assisted through the use of hydraulic assists or electric motors.

The mechanical steering systems are being replaced or supplemented by electrically driven steering systems, commonly known as "steer-by-wire" systems. Such steer-by-wire systems to varying extents replace, for example, the mechanical linkage between the steering wheel and the vehicle wheels with an electrically assisted actuator. The steer-by-wire system aims to eliminate physical or mechanical connection between a steering wheel and vehicle wheels by using electrically controlled motors change the direction of the vehicle wheels and to provide feedback to a driver.

It is with respect to these and other general considerations that the following embodiments have been described. Also, although relatively specific problems have been discussed, it should be understood that the embodiments should not be limited to solving the specific problems identified in the Background.

SUMMARY

The features and advantages of the present disclosure will be more readily understood and apparent from the following detailed description, which should be read in conjunction with the accompanying drawings, and from the claims which are appended to the end of the detailed description.

Various embodiments of the present disclosure may provide a motor control system configured to short motor windings of a motor so that the motor generates braking torque when all or some electric control units of the motor are disabled or failed. For example, the motor control system may use junction gate field-effect transistors (JFETs) controlled bipolar junction transistors (BJTs), solid state relays (SSRs) controlled BJTs, and depletion mode metal-oxide-semiconductor field-effect transistors (MOSFETs) to short the motor windings of the motor.

According to some embodiments of the present disclosure, a motor control system may comprise: a motor comprising a plurality of motor phase terminals; a plurality of electric control units electrically connected with the motor and configured to control the motor, wherein the electric control units are configured to output control signals, respectively; and a shorting circuit connected to between the motor and the electric control units, the shorting circuit configured to short the motor phase terminals in response to receiving none of the control signals from the electric control units. The shorting circuit is configured not to short the motor phase terminals when receiving at least one of the control signals from at least one of the electric control units.

The shorting circuit may comprise: first switches electrically connected with the electric control units, wherein the first switches may be configured to be turned on or off in response to at least one of the control signals output from the electric control units or one or more input signals associated with the control signals; and second switches, wherein each of the second switches may be electrically connected with a respective one of the first switches, and the second switches may be configured to be turned on or off in response to the turned on or off of the first switches to selectively short the motor phase terminals. The first switches may be configured to be turned on in response to receiving none of the control signals of the electric control units, and the second switches may be configured to be turned on in response to the turned on of the first switches so that the motor phase terminals can be shorted together through the second switches. The first switches may be configured to be turned off in response to receiving at least one of the control signals of the electric control units, and the second switches may be configured to be turned off in response to the turned off of the first switches so that the motor phase terminals cannot be shorted through the second switches.

The shorting circuit may further comprise electric components connected with the second switches, respectively, and configured to conduct a current, flowing from the motor through the second switches, in only one direction to form a return path for the current flowing from the motor. The electric components are connected with the second switches in parallel, respectively.

According to some embodiments of the present disclosure, the shorting circuit may comprise: junction gate field-effect transistors (JFETs) electrically connected with the electric control units, the JFETs configured to be turned on or off in response to at least one of the control signals of the electric control units or one or more input signals associated with the control signals; and bipolar junction transistors (BJTs) electrically connected with the JFETs, respectively, the BJTs configured to be turned on or off in response to the turned on or off of the JFETs to selectively short the motor phase terminals. The JFET may have a first terminal connected to between one of the motor phase terminals and one of the electric control units, a second terminal configured to receive at least one of the control signals of the electric control units or an input signal associated with the at least one of the control signals, and a third terminal. The BJT may have a first terminal connected to between the one of the motor terminals and the one of the electric control units, and a second terminal connected to the third terminal of the JFET, and a third terminal. The shorting circuit may further comprise a diode connected with the BJT in parallel, the diode having first and second terminals, wherein the first terminal of the diode may be connected to the first terminals of the JFET and the BJT connected to between the one of the motor phase terminals and the one of the electric control units, and the second terminal of the diode may be connected to the third terminal of the BJT. Alternatively, the shorting circuit may further comprise a metal-oxide-semiconductor field-effect transistor (MOSFET) connected with the BJT in parallel, the MOSFET having first, second and third terminals, wherein the first terminal of the MOSFET may be connected to the first terminals of the JFET and the BJT connected to between the one of the motor phase terminals and the one of the electric control units, and the second and third terminals of the MOSFET may be connected to the third terminal of the BJT.

According to certain embodiments of the present disclosure, the system may further comprise a voltage supply circuit connected between the electric control units and the first switches of the shorting circuit, the voltage supply circuit configured to supply voltage to the first switches using the control signals so that the voltage supplied using the control sign. As can turn off the first switches not to short the motor phase terminals together.

According to some embodiments of the present disclosure, the shorting circuit may comprise: solid state relays (SSRs) electrically connected with the electric control units, the SSRs configured to he turned on or off in response to at least one of the control signals output from the electric control units; and bipolar junction transistors (BJTs) electrically connected with the SSRs, respectively, the BJTs configured to be turned on or off in response to the turned on or off of the SSRs to selectively short the motor phase terminals. The SSRs may be configured to be normally closed, and to be opened when receiving the at least one of the control signals output from the electric control units. The BJTs may be configured to be turned on when the SSRs are closed so that the motor phase terminals can be shorted together, and to be turned off when the SSRs are opened by receiving the at least one of the control signals output from the electric control units. At least one of the SSRs may have a first terminal connected to between one of the motor phase terminals and one of the electric control units, a second terminal configured to receive at least one of the control signals output from the electric control units, and a third terminal connected to one of the BJTs. At least one of the BJTs may have a first terminal connected to between the one of the motor phase terminals and the one of the electric control units, and a second terminal connected to the at least one of the SSRs, and a third terminal connected to other BJTs. The shorting circuit may further comprise diodes connected with the BJTs in parallel, respectively, each of the diodes having first and second terminals, wherein the first terminal of at least one of the diodes may he connected to the first terminals of the at least one of the SSRs and the at least one of the BJTs connected to between the one of motor terminals and the one of the electric control units, and the second terminal of the at least one of the diodes may be connected to the third terminal of the at least one of the BJTs. Alternatively, the shorting circuit may further comprise MOSFETs connected with the BJTs in parallel, respectively, each of the MOSFETs having first, second and third terminals, wherein the first terminal of at least one of the MOSFETs may be connected to the first terminals of the at least one of the SSRs and the at least one of the BJTs connected to between the one of the motor phase terminals and the one of the electric control units, and the second and third terminals of the at least one of the MOSFETs may be connected to the third terminal of the at least one of the BJTs.

According to certain embodiments of the present disclosure, the shorting circuit may comprise a plurality of first switches, wherein first switches are connected between the motor phase terminals, the first switches configured to be turned on in response to receiving none of the control signals output from the electric control units to short the motor phase terminals together, and to be turned off in response to receiving at least one of the control signals output from the electric control units.

According to some embodiments of the present disclosure, the system may further comprise a plurality of power supplies connected between the electric control units and the first switches, and the power supplies are connected with one or more power sources or connected to a respective one of the electric control units to receive power. Each of the power supplies may be configured to supply a voltage, which is capable of turning off the first switches, to the first switches using the received power in response to a respective one of the control signals output from the electric control units.

According to certain embodiments of the present disclosure, the system may further comprise: a plurality of second switches configured to receive a respective one of the control signals from a respective one of the electric control units, and power from one or more power sources or the respective one of the electric control units and to output the power in response to the respective one of the control signals; and a plurality of isolated power supplies, each of the isolated power supplies configured to supply a voltage, which is capable of turning off the first switches, to the first switches using the power received from a respective one of the second switches. A respective one of the isolated power supplies may be connected between a respective one of the first switches and the respective one of the second switches.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
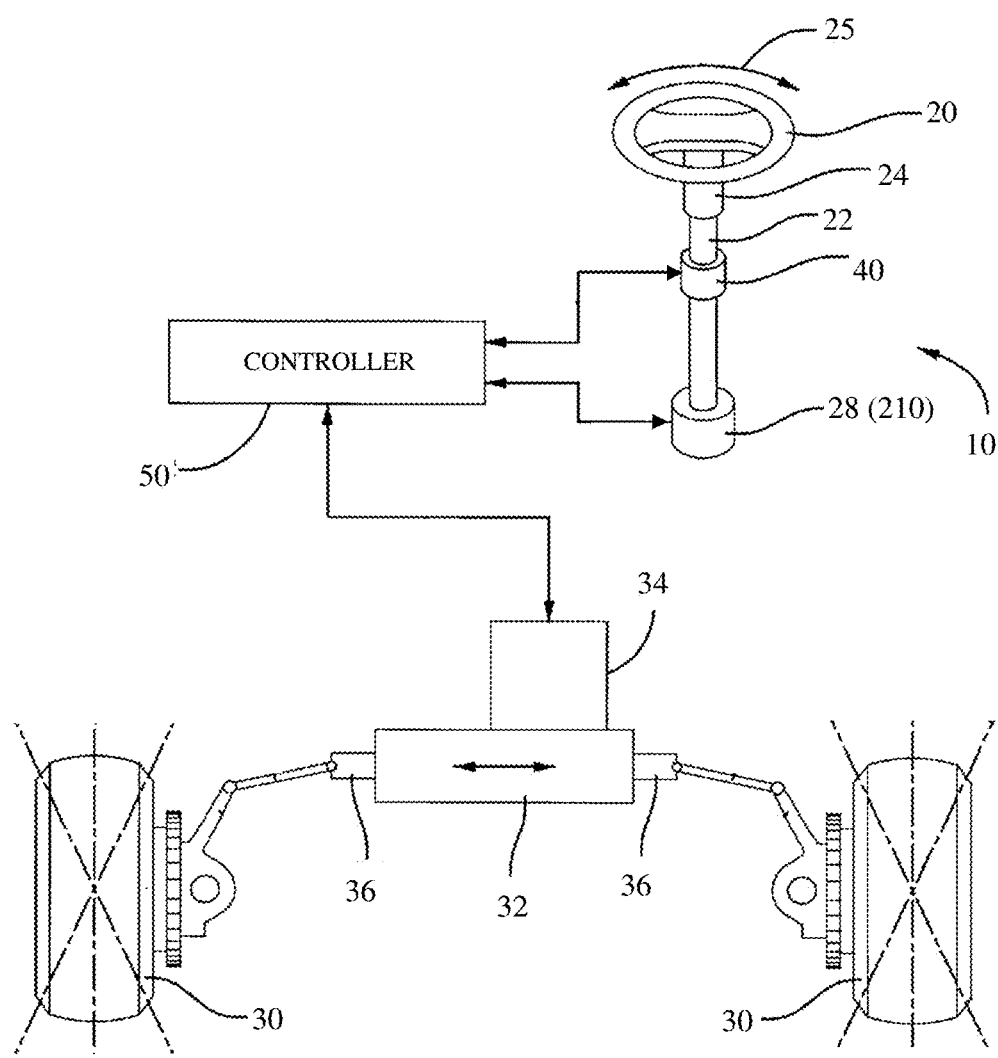
FIG. 1 is a schematic view of a vehicle including a steer-by-wire system according to an embodiment of the present disclosure.

Referring now to FIG. 1, a steer-by-wire system 10 for use in a vehicle 1 is illustrated. The steer-by-wire system 10 allows a driver or operator of the vehicle 1 to control the direction of the vehicle 1 or road wheels 30 of the vehicle 1 through the manipulation of a steering wheel 20. The steering wheel 20 is operatively coupled to a steering shaft (or steering column) 22. The steering wheel 20 may be directly or indirectly connected with the steering shaft 22. For example, the steering wheel 20 may be connected to the steering shaft 22 through a gear, a shaft, a belt and/or any connection means. The steering shaft 22 may be installed in a housing 24 such that the steering shaft 22 is rotatable within the housing 24.

The vehicle wheels 30 may be connected to knuckles, which are in turn connected to tie rods. The tie rods are connected to a steering assembly 32. The steering assembly 32 may include a steering actuator motor 34 (e.g. an electric motor) and steering rods 36. The steering rods 36 may be operatively coupled to the steering actuator motor 34 such that the steering actuator motor 34 is adapted to move the steering rods 36. The movement of the steering rods 36 controls the direction of the road wheels 30 through the knuckles and tie rods.

One or more sensors 40 may configured to detect position, angular displacement or travel 25 of the steering shaft 22 or steering wheel 20, as well as detecting the torque of the angular displacement. The sensors 40 provide electric signals to a controller 50 indicative of the angular displacement and torque 25. The controller 50 sends and/or receives signals to/from the steering actuator motor 34 to actuate the steering actuator motor 34 in response to the angular displacement 25 of the steering wheel 20.

In use, the steering wheel 20 is angularly displaced 25 such that the steering shaft 22 can be also angularly displaced. The sensors 40 detect the angular displacement and torque 25 of the steering shaft 22, and the sensors 40 send signals to the controller 50 indicative of the relative amount of angular displacement of the steering shaft 22. The controller 50 sends signals to the steering actuator motor 34 indicative of the relative amount of the angular displacement 30. In response, the steering actuator motor 34 moves the steering rod 36 laterally so that the road wheels 30 are turned. Thus, the controller 50 controls the distance that the steering rod 36 is moved based on the amount of the angular displacement 25 of the steering shaft 22. Movement of the steering rod 36 manipulates the tie rods and knuckles to reposition the road wheels 30 of vehicle 1. Accordingly, when the steering wheel 20 is turned, the road wheels 30 are turned.

In the steer-by-wire steering system, the steering wheel 20 may be mechanically isolated from the road wheels 30. For example, the steer-by-wire system has no mechanical link connecting the steering wheel 25 from the road wheels 30. Accordingly, the steer-by wire steering system needs to provide the driver or operator with the same "road feel" that the driver receives with a direct mechanical link. Furthermore, it is desirable to have a device that provides a mechanical back up "road feel" in the event of multiple electronic failures in the steer-by-wire system. In addition, a device that provides positive on-center feel and accurate torque variation as the handwheel is rotated is also desirable.

Therefore, the vehicle 1 may comprise a feedback actuator (FBA) or steering feel actuator (SFA) 28. The feedback actuator or steering feel actuator 28 may comprise an electric motor (e.g. a motor 210 of FIG. 2) which is connected to the steering shaft or steering column 22. For example, a gear or belt assembly may connect an output of the feedback actuator 28 to the steering shaft 22. Alternatively, the feedback actuator 28 may be directly coupled to the steering shaft 22. The feedback actuator 28 is actuatable to provide resistance to rotation of the steering wheel 20. The controller 50 is operatively coupled to the sensors 40 and to the feedback actuator 28. The controller 50 receives signals indicative of the applied torque and angular rotation of the steering wheel 20 from the sensors 40. In response to the signals from the sensors 40, the controller 50 generates and transmits a signal corresponding to the sensed torque and angular rotation of the steering wheel 20 sensed by the sensors 40 and the feedback actuator 28 generates resistance torque to the rotation of the steering wheel 20 in response to the signal of the controller 50 to provide the road feel to the driver. However, when the feedback of the feedback actuator 28 is removed due to system failures such as inverter and it's control failures, the driver will have the uncomfortable feeling of being separated from the road wheels, not quite in control, and will tend to oversteer the vehicle, particularly in demanding situations such as sharp or sudden turns.

Therefore, according to some embodiments of the present disclosure, a motor control system is configured to short motor windings of a motor included in, for example, but not limited to, the feedback actuator or steering feel actuator with or without battery power available in a vehicle so that the motor provides the braking torque to the steering wheel when all or some electric control units of the feedback actuator or steering feel actuator are disabled or failed. This may prevent the driver oversteer.

Figure 2:
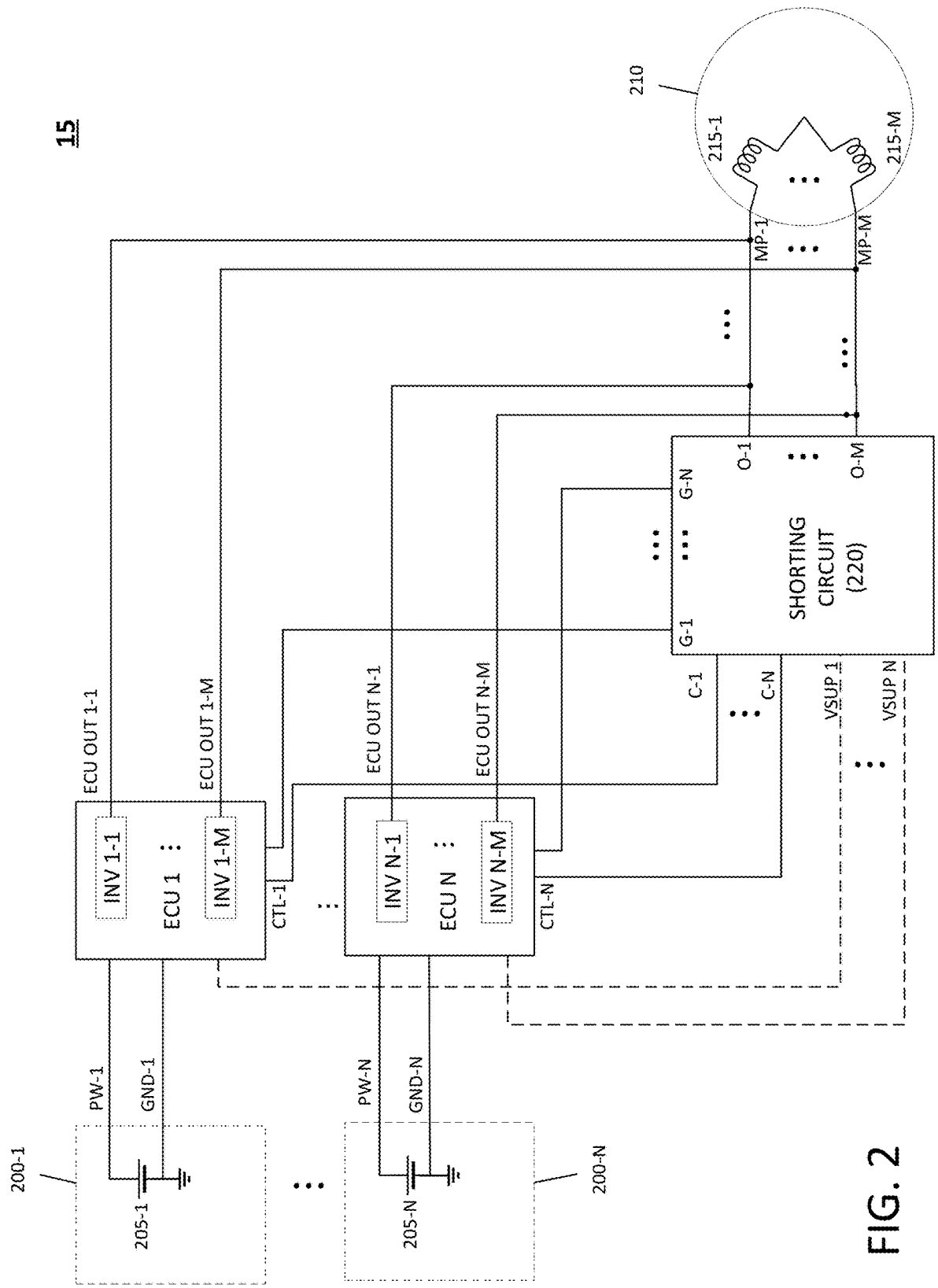
FIG. 2 is a schematic diagram of a motor control system according to an embodiment of the present disclosure.

FIG. 2 is a schematic diagram of a motor control system according to an embodiment of the present disclosure.

Power sources 200-1 to 200-N (N is a positive integer more than 1) are configured to supply power to a respective one of electric control units (ECUs) 1 to N. The power sources 200-1 to 200-N supply power to a respective one of ECUs 1 to N. For example, the power sources 200-1 to 200-N may be batteries 205-1 to 205-N. The power sources 200-1 to 200-N may be electrically connected to the ECUs 1 to N through power lines PW-1 to PW-N and ground lines GND-1 to GND-N, respectively. Alternatively, the power lines PW-1 to PW-N and ground lines GND-1 to GND-N of the power sources 200-1 to 200-N may be directly connected to the shorting circuit 220 as well as ECUs 1 to N.

The motor 210 may be, for example, but not limited to, a multi-phase motor comprising a plurality of motor windings 215-1 to 215-M (M is a positive integer more than 1). The motor 210 may have a plurality of motor phase terminals MP-1 to MP-M connected to a respective one of the motor windings 215-1 to 215-M. For example, the motor 210 may be a multi-phase AC permanent magnet motor. In the present embodiment, the motor 210 may be a three-phase permanent magnet motor having a U-phase winding 215-1, a V-phase winding 215-2, and a W-phase winding 215-3, but it should be appreciated that embodiments of the present disclosure should not be limited to such. One having ordinary skill in the art would understand that the present disclosure can be implemented with a two-phase motor or a more than three-phase motor.

The ECUs 1 to N comprise multi-phases (M-phases) inverters INV 1-1 to N-M. The inverters INV 1-1 to N-M are coupled to the motor phase terminals MP-1 to MP-M connected to a respective one of the motor windings 215-1 to 215-M. The inverters INV 1-1 to N-M receive power from the power sources 200-1 to 200-N, and convert direct current (DC) voltages provided from the power sources 200-1 to 200-N to alternating currents (AC). The outputs generated by the inverters INV 1-1 to N-M are applied to the motor windings 215-1 to 215-M through the motor phase terminals MP-1 to MP-M to drive the multi-phase (M-phase) motor 210. The ECUs 1 to N also generate control signals CTL-1 to CTL-N. For example, the control signals CTL-1 to CTL-N may have substantially the same voltage as battery voltages of the batteries 205-1 to 205-N of the power sources 200-1 to 200-N, but it should be appreciated that embodiments of the present disclosure should not be limited to such. Alternatively, the voltages of the control signals CTL-1 to CTL-N may be different from the battery voltages of the batteries 205-1 to 205-N of the power sources 200-1 to 200-N. The ECUs 1 to N may convert the battery voltages of the batteries 205-1 to 205-N into different voltages that supply to the shorting circuit 220.

Optionally, the ECUs 1 to N supplies power to the shorting circuit through terminals VSUP 1 to VSUP N. Alternatively, the terminals VSUP 1 to VSUP N of the shorting circuit 220 may be directly connected to the power sources 200-1 to 200-N.

The ECUs 1 to N may have, for example, but not limited to, one or more of a circuit, microprocessor or computer, which monitors and physically alters the operating conditions of the motor control system 15. The ECUs 1 to N may also be configured to accept input and output from a wide array of input and output devices for receiving or sending values.

The shorting circuit 220 is connected to between the ECUs 1 to N and the motor phase terminals MP-1 to MP-M of the motor 210. The shorting circuit 200 is configured to selectively short the motor phase terminals MP-1 to MP-M in response to one or more of the control signals CTL-1 to CTL-N received from the ECUs 1 to N. For example, when the shorting circuit 220 receives no control signal from all of the ECUs 1 to N, such as in the case that all ECUs 1 to N are disabled or failed (for example, all invertors of ECUs 1 to N are disabled or failed), the shorting circuit 220 is configured to short the motor phase terminals MP-1 to MP-M so that the motor 210 can generate the braking torque. However, when the shorting circuit 220 receives at least one of the control signals CTL-1 to CTL-N from at least one of the ECUs 1 to N, such as in the case that any one of the ECUs 1 to N is enabled, the shorting circuit 220 is configured to remove the short of the motor phase terminals MP-1 to MP-M or does not short the motor phase terminals MP-1 to MP-M.

Figure 3:
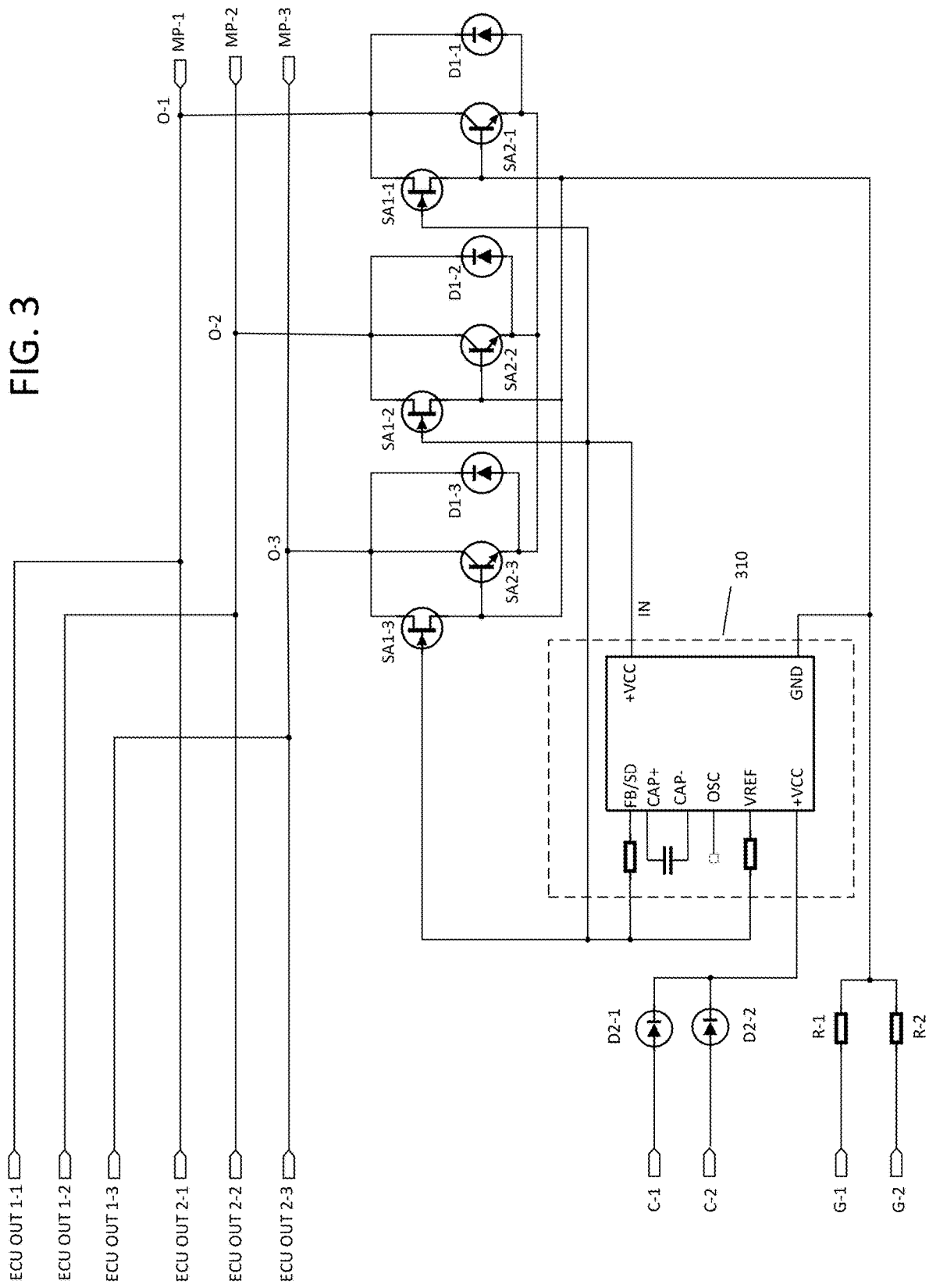
FIGS. 3-8 are conceptual circuit diagrams of circuits for selectively shorting motor phase terminals according to embodiments of the present disclosure.

FIG. 3 is a conceptual circuit diagram of the shorting circuit 220 according to an embodiment of the present disclosure.

The shorting circuit 220 may comprise a plurality of first switches SA1-1 to SA1-M. The first switches SA1-1 to SA1-M are connected to the motor phase terminals MP-1 to MP-N, respectively. The first switches SA1-1 to SA1-M are also electrically connected to the ECUs 1 to N and are configured to receive an input signal IN associated with the control signals CTL-1 to CTL-N. The input signal IN may be, for example, but not limited to, the control signals CTL-1 to CTL-N themselves, any signal generated using at least one of the control signals CTL-1 to CTL-N (e.g. a signal generated by a charge pump, a negative voltage source, or an isolated power supply using at least one of the control signals CTL-1 to CTL-N), or any signal directly or indirectly related to at least one of the control signals CTL-1 to CTL-N.

Figure 4:
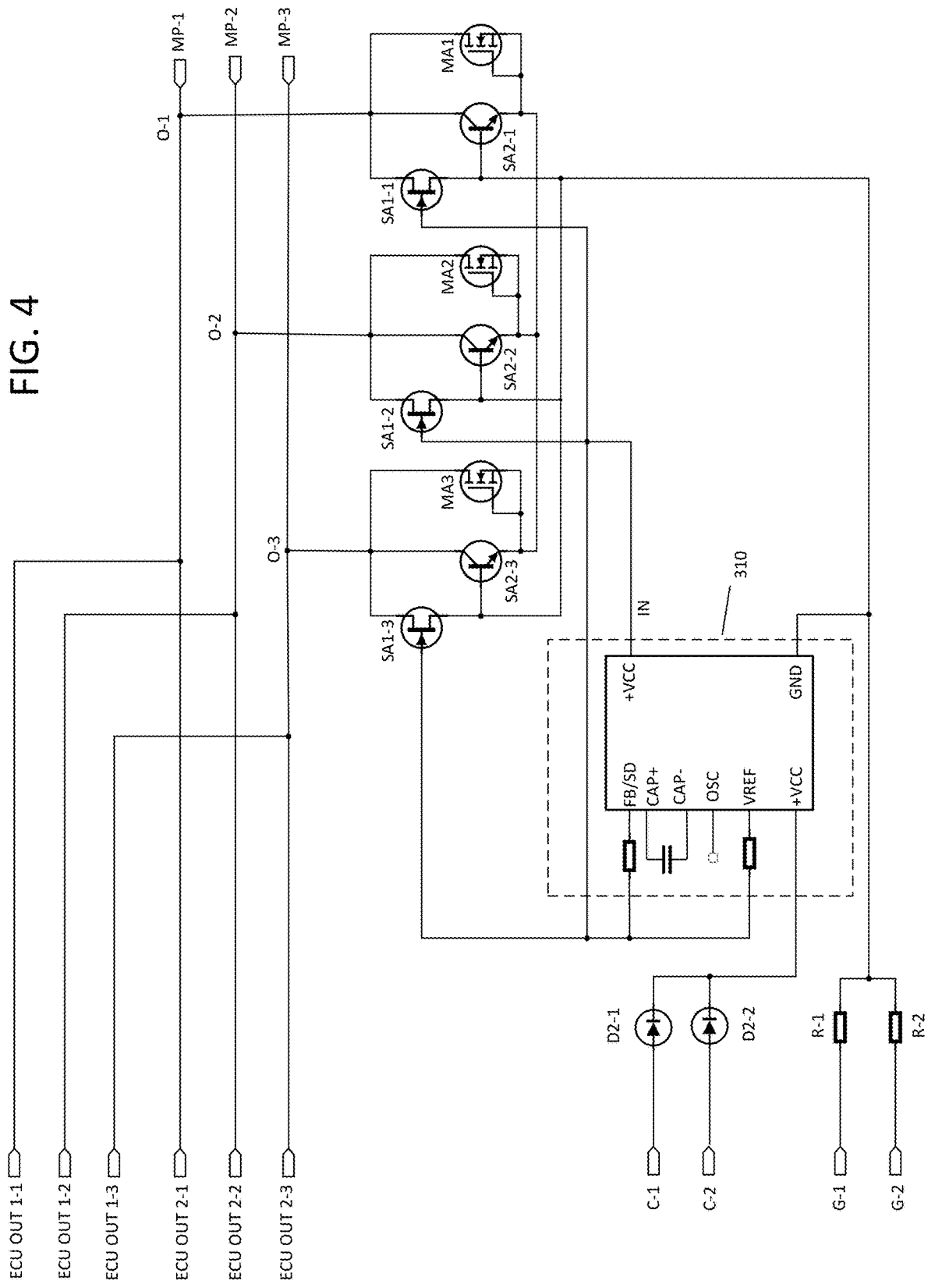

In a first exemplary embodiment, as shown in FIGS. 3 and 4, a voltage supply circuit 310 may be connected between the electric control units ECUs 1 to N and the first switches SA1-1 to SA1-M of the shorting circuit 220. The voltage supply circuit 310 may be configured to receive the control signals CTL-1 to CTL-N and to supply voltage to the first switches SA1-1 to SA1-M using the control signals CTL-1 to CTL-N so that the voltage supplied by the voltage supply circuit 310 can turn off the first switches SA1-1 to SA1-M. Accordingly, the voltage supply circuit 310 may output the input signal IN using the control signals CTL-1 to CTL-N. Although the voltage supply circuit 310 is included in the shorting circuit 220 in the exemplary embodiment of FIGS. 3 and 4, the voltage supply circuit 310 can be a separate circuit from the shorting circuit 220.

Figure 5:
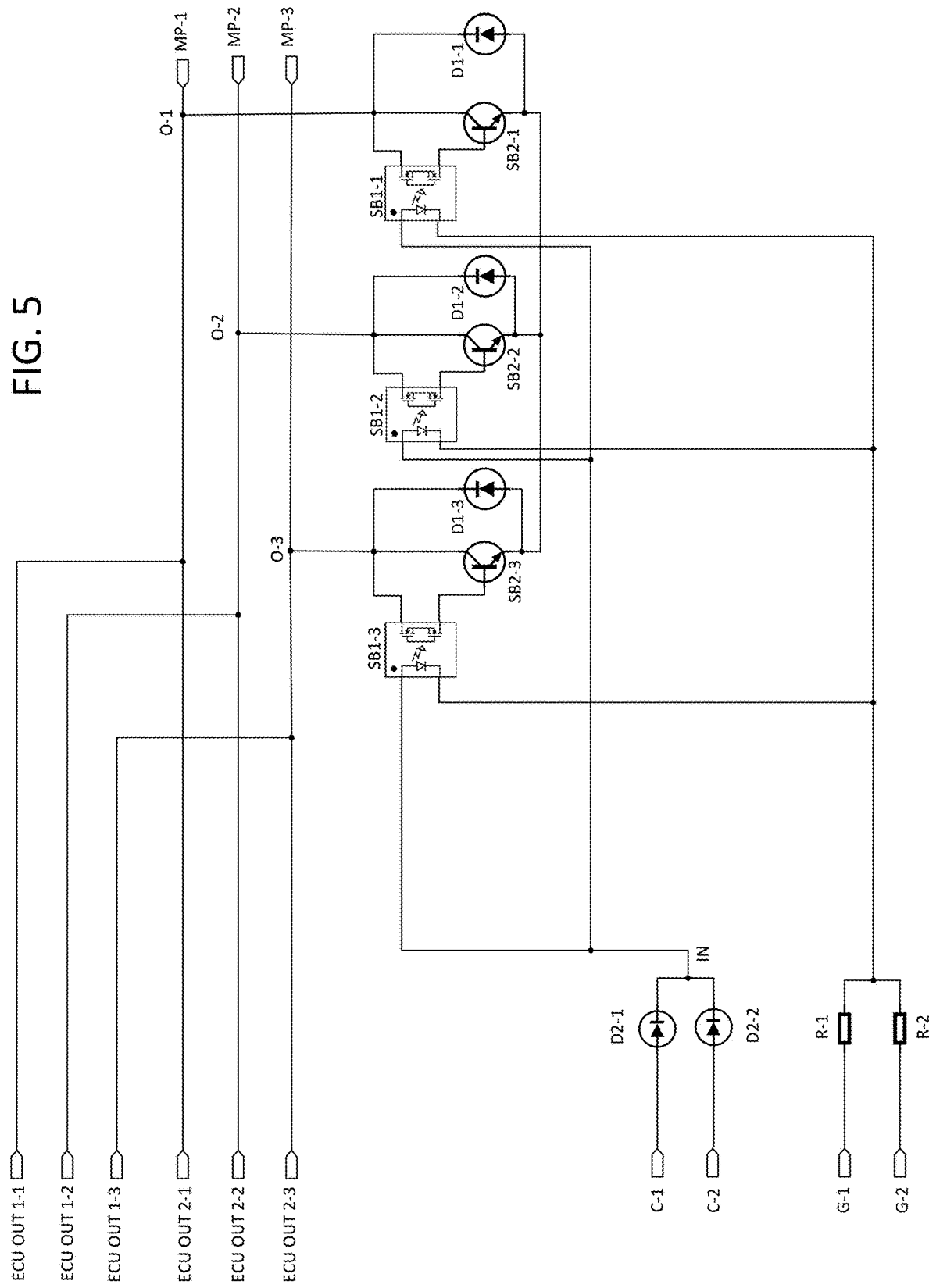
Figure 6:
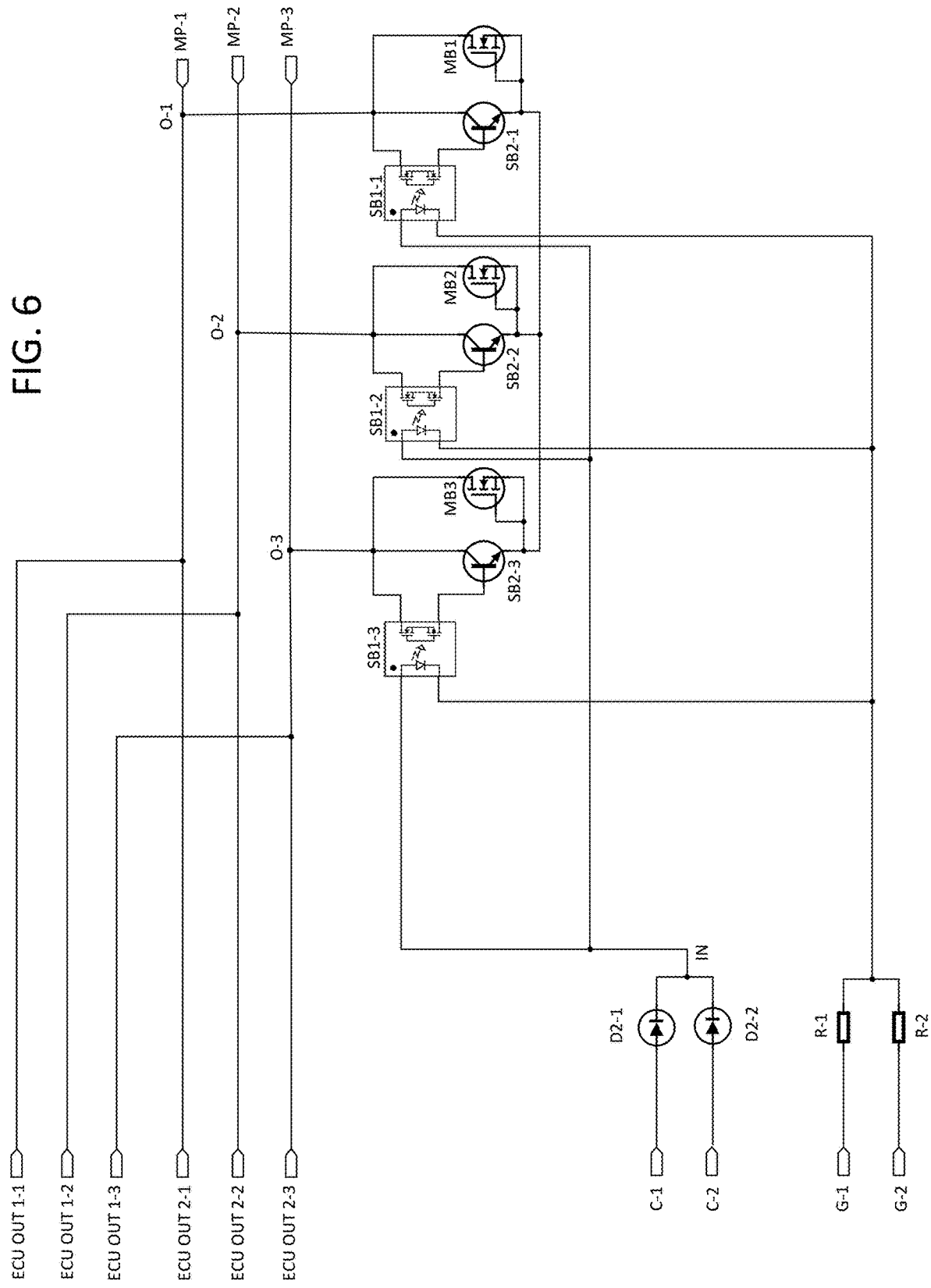

In a second exemplary embodiment, as shown in FIGS. 5 and 6, the input signal IN can be the control signals CTL-1 to CTL-N themselves. The voltages of the control signals CTL-1 to CTL-N may be within a range that can turn off the first switches SB1-1 to SB1-M.

Diodes 2-1 to 2-N are connected to terminals C-1 to C-N configured to receive the control signals CTL-1 to CTL-N from the ECUs 1 to N, respectively. The diodes 2-1 to 2-N can perform a OR function for the control signals CTL-1 to CTL-N so that at least one of the control signals CTL-1 to CTL-N received through the terminals C-1 to C-N can be provided to the voltage supply circuit 310 or the first switches SA1-1 to SA1-M.

Resistors R-1 to R-N are connected to terminals G-1 to G-N which are connected to grounds of the electric control units ECUs 1 to N, respectively. The resistors R-1 to R-N may be configured to provide isolation between the grounds of the electric control units ECUs 1 to N.

The first switches SA1-1 to SA1-M may be turned on (i.e. closed) or turned off (i.e. open) in response to one or more input signals associated with the control signals CTL-1 to CTL-N in order to cause the motor phase terminals MP-1 to MP-N to be selectively shorted. For example, the first switches SA1-1 to SA1-M are normally turned on to conduct current, and are turned off when receiving a voltage which is more than, or less than, a threshold. The first switches SA1-1 to SA1-M are turned on when receiving none of the input signals associated with the control signals CTL-1 to CTL-N. However, the first switches SA1-1 to SA1-M are turned off when receiving any one of the control signals CTL-1 to CTL-N from one of the ECUs 1 to N.

The shorting circuit 220 may further comprise a plurality of second switches SA2-1 to SA2-M. Each of the second switches SA2-1 to SA2-M may be electrically connected with a respective one of the first switches SA1-1 to SA1-M. The second switches SA2-1 to SA2-M may be configured to be turned on or off in response to the turn-on or turn-off of the first switches SA1-1 to SA1-M. For example, when the first switches SA1-1 to SA1-M are turned on, the second switches SA2-1 to SA2-M may short the motor phase terminals MP-1 to MP-M. However, when the first switches SA1-1 to SA1-M are turned off, the second switches SA2-1 to SA2-M may not short the motor phase terminals MP-1 to MP-M or may remove the short of the motor phase terminals MP-1 to MP-M. The number of the first switches SA1-1 to SA1-M and the second switches SA2-1 to SA2-M may correspond to the number of the phases of the motor 210. For instance, in the embodiment of FIG. 3, because the motor 210 is a three-phase motor, the shorting circuit 220 has three (3) first switches SA1-1, SA1-2, SA1-3 and three (3) second switches SA2-1, SA2-2, SA2-3. However, the shorting circuit 220 may have the different number of the first switches SA1-1 to SA1-M and/or the second switches SA2-1 to SA2-M from the number of the phases of the motor 210.

For illustration purposes, in this exemplary embodiment shown in FIG. 3, the motor 210 is shown as a three-phase motor having phases U, V, W and two (2) ECUs, ECU 1 and ECU 2, are connected to the shorting circuit 220. However, the present disclosure is not limited thereto.

In the exemplary embodiment illustrated in FIG. 3, the first switches SA1-1, SA1-2, SA1-3 may be junction gate field-effect transistors (JFETs). For example, the first switches SA1-1, SA1-2, SA1-3 may be an N-channel MET. The BJTs SA2-1, SA2-2, SA2-3 are connected with the JFETs SA1-1, SA1-2, SA1-3, respectively. However, one skilled in the art will recognize that other transistor types including a P-channel JFET could be used instead of the N-channel JFET, the substitution could be made to replace the N-channel JFET with P-channel JFET by modifying connections and adding or removing other electric components. Further, any switch, such as a transistor, which can be turned on when a voltage between a first terminal of the switch and a second terminal of the switch is below a threshold (or above the threshold) and can be turned off when the voltage between the first terminal of the switch and the second terminal of the switch is above the threshold (or below the threshold), can be used instead of the JFETs.

The shorting circuit 220 receives the control signals CTL-1 and CTL-2 from the ECU 1 and ECU 2 of FIG. 2 through terminals C-1 and C-2, respectively. The control signals CTL-1 and CTL-2 received from the ECU 1 and ECU 2 are provided to first terminals (e.g. gates) of the JFETs SA1-1, SA1-2, SA1-3. Second terminals (e.g. sources) of the JFETs SA1-1, SA1-2, SA1-3 are connected to each other. A third terminal (e.g. drain) of the JFET SA1-1 is connected to a U-phase motor terminal MP-1 connected to the motor winding 215-1, a third terminal (e.g. drain) of the JFET SA1-2 is connected to a V-phase motor terminal MP-2 connected to the motor winding 215-2, and a third terminal (e.g. drain) of the JFET SA1-3 is connected to a W-phase motor terminal MP-3 connected to the motor winding 215-3.

The shorting circuit 220 further includes second switches SA2-1, SA2-2, SA2-3. The second switches SA2-1, SA2-2, SA2-3 may be bipolar junction transistors (BJTs). The BJTs SA2-1, SA2-2, SA2-3 are connected with the JFETs SA1-1, SA1-2, SA1-3, respectively. The second switches BJT SA2-1, SA2-2, SA2-3 can be, for example, but not limited to, an NPN transistor. However, one skilled in the art will recognize that other transistor types including a PNP transistor could be used instead of the NPN BJT shown in this illustrative example, the substitution could be made to replace the NPN BJT with PNT BJT by modifying connections and adding or removing other electric components. Further, any switch, such as a transistor, which can be turned on or can control current in response to an input current and can be turned off when receiving no input current, can be used instead of the BJT. The second switches BJTs SA2-1, SA2-2, SA2-3 may be configured to be turned on in response to a current from the motor 210 through the JFETs SA1-1, SA1-2, SA1-3 when the JFETs SA1-1, SA1-2, SA1-3 are turned on. The current provided to the second switches BJTs SA2-1, SA2-2, SA2-3 may be generated from the motor 210 by the driver's rotation of the steering wheel 20 which in turn causes the rotor included in the motor 210 to be rotated. However, the second switches BJTs SA2-1, SA2-2, SA2-3 may be configured to be turned off when the JFETs SA1-1, SA1-2, SA1-3 are turned off.

First terminals (e.g. base) of the BJTs SA2-1, SA2-2, SA2-3 are connected with the second terminals (e.g. source) of the JFETs SA1-1, SA1-2, SA1-3 to receive a current from the JFETs SA1-1, SA1-2, SA1-3. Second terminals (e.g. emitter) of the BJTs SA2-1, SA2-2, SA2-3 are connected to each other so that the motor phase terminals MP-1 to MP-3 can be shorted when the BJTs SA2-1, SA2-2, SA2-3 are turned on. A third terminal (e.g. collector) of the BJT SA2-1 is connected to a U-phase motor terminal MP-1 connected to the motor winding 215-1, a third terminal (e.g. collector) of the BJT SA2-2 is connected to a V-phase motor terminal MP-2 connected to the motor winding 215-2, and a third terminal (e.g. collector) of the BJT SA2-3 is connected to a W-phase motor terminal MP-3 connected to the motor winding 215-3.

Diodes D1-1, D1-2, D1-3 may be connected to the second switches SA2-1, SA2-2, SA2-3, respectively. For example, each of the diodes D1-1, D1-2, D1-3 are connected with a respective one of the BJTs SA2-1, SA2-2, SA2-3 in parallel. The diodes D1-1, D1-2, D1-3 may be configured to conduct a current, flowing from the motor 250 through the BJTs SA2-1, SA2-2, SA2-3, in only one direction to form a return path for the current flowing from the motor 250. Each of the diodes D1-1, D1-2, D1-3 has a first terminal (e.g. cathode) and a second terminal (e.g. anode). The first terminal (e.g. cathode) of the diode D1-1, D1-2, D1-3 may be connected to the first terminals of the JFET SA1-1, SA1-2, SA1-3 and the BJT SA2-1, SA2-2, SA2-3 connected to between one of the motor phase terminals MP-1 to MP-3 and one of the electric control units ECU 1 and ECU 2. The second terminal (e.g. anode) of the diode D1-1, D1-2, D1-3 is connected to the third terminal (e.g. collector) of the BJT SA2-1, SA2-2, SA2-3. Although FIG. 3 uses the diodes D1-1, D1-2, D1-3, any electric components that are capable of conducting a current in one direction only and limiting current flow in the other direction can replace the diodes D1-1, D1-2, D1-3. For instance, as illustrated in FIG. 4, Metal-Oxide-Semiconductor Field-Effect Transistor (MOSFET) MA1, MA2, MA3 (e.g. N-channel MOSFET) can be used instead of the diodes D1-1, D1-2, D1-3.

In operation, when all of the ECUs 1 and 2 are disabled or failed (for instance all of invertors of the ECUs 1 and 2 are disabled or failed), voltages of the control signals CTL-1 and CTL-2 inputted from the ECUs 1 and 2 through the terminals C-1 and C-2 are at 0V. Then, the voltage supply circuit 310 provides no input signal IN or an input signal IN at 0V to the gates of the JFET SA1-1, SA1-2, SA1-3, and the gates of the JFET SA1-1, SA1-2, SA1-3 are at 0V. Because the gate-source voltage of the JFETs SA1-1, SA1-2, SA1-3 is 0V and the JFETs SA1-1, SA1-2, SA1-3 are normally-on devices, the JFETs SA1-1, SA1-2, SA1-3 are turned on (i.e. closed). This makes current flowing from the motor 210 flow through the JFETs SA1-1, SA1-2, SA1-3. In turn, the current flowing through the JFETs SA1-1, SA1-2, SA1-3 to the bases of the BJTs SA2-1, SA2-2, SA2-3 turns on the BJTs SA2-1, SA2-2, SA2-3, and then the current from the motor 210 flows through the BJTs SA2-1, SA2-2, SA2-3 and return to the motor phase terminals MP-1, MP-2, MP-3 through the diodes D1-1, D1-2, D1-3 of FIG. 3 (or the MOSFETs MA1, MA2, MA3 of FIG. 4) forming a return path for the current flowing from the motor 250 so that the motor phase terminals MP-1, MP-2, MP-3 can be shorted together. This results in the braking of the motor 210. The motor 210 may act as a brake and/or damper to oppose any motion applied to the motor 210.

However, if any one of the ECUs 1 and 2 is enabled, the control signals CTL1 and CTL2 received from the ECUs 1 and 2 through CT-1 and CT-2 are inputted into the voltage supply circuit 310, and the voltage supply circuit 310 provides, to the gates of the JFETs SA1-1, SA1-2, SA1-3, an input signal IN at a voltage which can turn off (i.e. open) the JFET. Then, because the gate-source voltage of the JFETs SA1-1, SA1-2, SA1-3 is at the voltage that can turn off the JFET, the JFETs SA1-1, SA1-2, SA1-3 are turned off. This makes no current flow to the bases of the BJTs SA2-1, SA2-2, SA2-3 and prohibits the BJTs SA2-1, SA2-2, SA2-3 from turning on. In turn, the motor phase terminals MP-1, MP-2, MP-3 are not shorted together, or the short status of the motor 210 is removed.

Therefore, when all invertors INV 1-1 to INV N-M of the ECUs 1 to N are disabled or failed, the shorting circuit 220 is configured to short the motor phase terminals MP-1 to MP-M connected to the motor windings 215-1 to 215-M so that the motor 210 can generate the braking torque. In the case that the motor 210 is included in the feedback actuator or steering feel actuator 28, the feedback actuator or steering feel actuator 28 may generate the braking torque to the steering wheel 20 and prevent from providing uncomfortable feeling of being separated from the road wheels to the driver or oversteering the vehicle by the driver when all or some electric control units of the feedback actuator or steering feel actuator 28 are disabled or failed.

FIG. 5 is a conceptual circuit diagram of the shorting circuit 220 according to another embodiment of the present disclosure.

The shorting circuit 220 may comprise a plurality of first switches SB1-1 to SB1-M. The first switches SB1-1 to SB1-M are connected to the motor phase terminals MP-1 to MP-N, respectively. The first switches SB1-1 to SB1-M are also electrically connected to the ECUs I to N and are configured to receive the control signals CTL-1 to CTL-N. Alternatively, as described above with reference to FIGS. 3 and 4, the first switches SB1-1 to SB1-M may receive the input signal IN which is generated using the control signals CTL-1 to CTL-N by other electric component(s), such as the voltage supply circuit 310.

Diodes 2-1 to 2-N are connected to terminals C-1 to C-N configured to receive the control signals CTL-1 to CTL-N from the ECUs 1 to N, respectively. The diodes 2-1 to 2-N can perform a OR function for the control signals CTL-1 to CTL-N so that at least one of the control signals CTL-1 to CTL-N received through the terminals C-1 to C-N can be provided to the first switches SB1-1 to SB1-M.

Resistors R-1 to R-N are connected to terminals G-1 to G-N which are connected to grounds of the electric control units ECUs 1 to N, respectively. The resistors R-1 to R-N may be configured to provide isolation between the grounds of the electric control units ECUs 1 to N.

The first switches SB1-1 to SB1-M may be turned on (i.e. closed) or turned off (i.e. open) in response to at least one of the control signals CTL-1 to CTL-N in order to cause the motor phase terminals MP-1 to MP-N to be selectively shorted. For example, the first switches SB1-4 to SB1-M are normally closed (ON) to conduct current, and are turned off when receiving a voltage which is more than a threshold (or less than the threshold). The first switches SB1-1 to SB1-M are turned on when receiving none of the control signals CTL-1 to CTL-N. However, the first switches SB1-1 to SB1-M are turned off when receiving any one of the control signals CTL-1 to CTL-N from one of the ECUs 1 to N.

The shorting circuit 220 may further comprise a plurality of second switches SB2-1 to S132-M. Each of the second switches SB2-1 to SB2-M may be electrically connected with a respective one of the first switches SB1-1 to SB1-M. The second switches SB2-1 to SB2-M may be configured to be turned on or off in response to the turn-on or turn-off of the first switches SB1-1 to SB1-M. For example, when the first switches SB1-1 to SB1-M are turned on, the second switches SB2-1 to SB2-M short the motor phase terminals MP-1 to MP-M together. However, when the first switches SB1-1 to SB1-M are turned off, the second switches SB2-1 to SB2-M may not short the motor phase terminals MP-1 to MP-M or may remove the short of the motor phase terminals MP-1 to MP-M. The number of the first switches SB1-1 to SB1-M and the second switches SB2-1 to SB2-M may correspond to the number of the phases of the motor 210. For instance, in the embodiment of FIG. 5, because the motor 210 is a three-phase motor, the shorting circuit 220 has three (3) first switches SB1-1, SB1-2, SB1-3 and three (3) second switches SB2-1, SB2-2, SB2-3. However, the shorting circuit 220 may have the different number of the first switches SB1-1 to SB1-M and/or the second switches SB2-1 to SB2-M from the number of the phases of the motor 210.

For illustration purposes, in this exemplary embodiment shown in FIG. 5, the motor 210 is shown as a three-phase motor having phases U, V, W, and two (2) ECUs, ECU 1 and ECU 2, are connected with the shorting circuit 220. However, the present disclosure is not limited thereto.

In the exemplary embodiment illustrated in FIG. 5, the first switches SB1-1, SB1-2, SB1-3 may be Solid-State Relays (SSRs). The SSR is an electronic switching device that switches on or off when a small external voltage is applied across its control terminals. For example, the SSR includes a sensor which responds to an appropriate input (control signal), a solid-state electronic switching device which switches power to the load circuitry, and a coupling mechanism to enable the control signal to activate this switch without mechanical parts. The SSR may provide complete electrical isolation between its input and output contacts with its output acting like a conventional electrical switch in that it has very high, almost infinite resistance when nonconducting (open), and a very low resistance when conducting (closed). The SSRs SB1-1, SB1-2, SB1-3 may be configured to be normally closed. For example, when the SSRs SB1-1, SB1-2, SB1-3 receive none of the control signals CTL-1 and CTL-2, the SSRs SB1-1, SB1-2, SB1-3 are closed. However, when receiving at least one of the control signals CTL-1 and CTL-2, the SSRs SB1-1, SB1-2, SB1-3 are opened. However, any switch, such as a transistor, which can be turned on when a voltage between a first terminal of the switch and a second terminal of the switch is below a threshold (or above the threshold) and can be turned off when the voltage between the first terminal of the switch and the second terminal of the switch is above the threshold (or below the threshold), or vice versa, can be used instead of the SSRs.

The shorting circuit 220 receives the control signals CTL-1 and CTL-2 from the ECU 1 and ECU 2 of FIG. 2 through terminals C-1 and C-2, respectively. The control signals CTL-1 and CTL-2 received from the ECU 1 and ECU 2 are provided to first input terminals of the SSRs SB1-1, SB1-2, SB1-3. Second input terminals of the SSRs SB1-1, SB1-2, SB1-3 may be connected to the terminals G-1 and G-2 which are connected to grounds of the electric control units ECUs 1 and 2 or any other components. A first output terminal of the SSR SB1-1 is connected to a U-phase motor terminal MP-1 connected to the motor winding 215-1, a first output terminal of the SSR SB1-2 is connected to a V-phase motor terminal MP-2 connected to the motor winding 215-2, and a first output terminal of the SSR SB1-3 is connected to a W-phase motor terminal MP-3 connected to the motor winding 215-3. Second output terminals of the SSRs SB1-1, SB1-2, SB1-3 are connected to the second switches SB2-1, SB2-2, SB2-3, respectively.

The shorting circuit 220 further includes second switches SB2-1, SB2-2, SB2-3. The second switches SB2-1, SB2-2, SB2-3 may be bipolar junction transistors (BJTs). The BJTs SB2-1, SB2-2, SB2-3 are connected with the SSRs SB1-1, SB1-2, SB1-3, respectively. The second switches BJT SB2-1, SB2-2, SB2-3 can be, for example, but not limited to, an NPN transistor. However, one skilled in the art will recognize that other transistor types including a PNP transistor could be used instead of the NPN BJT shown in this illustrative example, the substitution could be made to replace the NPN BJT with PNP BJT by modifying connections and adding or removing other electric components. Further, any switch, such as a transistor, which can be turned on or can control current in response to an input current and can be turned off when receiving no input current, can be used instead of the BJT. The second switches BJTs SB2-1, SB2-2, SB2-3 may be configured to be turned on in response to a current from the motor 210 through the SSRs SB1-1, SB1-2, SB1-3 when the SSRs SB1-1, SB1-2, SB1-3 are turned on (i.e. closed). The current provided to the second switches BJTs SB2-1, SB2-2, SB2-3 may be generated from the motor 210 by the driver's rotation of the steering wheel 20 which in turn causes the rotor included in the motor 210 to be rotated. However, the second switches BJT SB2-1, SB2-2, SB2-3 may be configured to be turned off when the SSRs SB1-1, SB1-2, SB1-3 are turned off (i.e. open).

First terminals (e.g. base) of the BJTs SB2-1, SB2-2, SB2-3 are connected with the second output terminals of the SSRs SB1-1, SB1-2, SB1-3 to receive a current from the SSRs SB1-1, SB1-2, SB1-3. Second terminals (e.g. emitter) of the BJTs SB2-1, SB2-2, SB2-3 are connected to each other so that the motor phase terminals MP-1 to MP-3 can be shorted when the BJTs SB2-1, SB2-2, SB2-3 are turned on. A third terminal (e.g. collector) of the BJT SB2-1 is connected to a U-phase motor terminal MP-1 connected to the motor winding 215-1, a third terminal (e.g. collector) of the BJT SB2-2 is connected to a V-phase motor terminal MP-2 connected to the motor winding 215-2, and a third terminal (e.g. collector) of the BJT SB2-3 is connected to a W-phase motor terminal MP-3 connected to the motor winding 215-3.

Diodes D1-1, D1-2, D1-3 may be connected to the second switches SB2-1, SB2-2, SB2-3, respectively. For example, each of the diodes D1-1, D1-2, D1-3 are connected with a respective one of the BJTs SB2-1, SB2-2, SB2-3 in parallel. The diodes D1-1, D1-2, D1-3 may be configured to conduct a current, flowing from the motor 210 through the SSRs SB1-1, SB1-2, SB1-3, in only one direction to form a return path for the current flowing from the motor 210. Each of the diodes D1-1, D1-2, D1-3 has a first terminal (e.g. cathode) and a second terminal (e.g. anode). The first terminal (e.g. cathode) of the diode D1-1, D1-2, D1-3 may be connected to the first output terminal of the SSR SB1-1, SB1-2, SB1-3 and the third terminal (e.g. collector) of the BJT SB2-1, SB2-2, SB2-3 connected to between the motor phase terminals MP-1 MP-2, MP-3 and the electric control unit outputs ECU OUT 1_1, ECU OUT 1_2, ECU OUT 1_3 and ECU OUT 2_1, ECU OUT 2_2, ECU OUT 2_3. The second terminal (e.g. anode) of the diode D1-1, D1-2, D1-3 is connected to the second terminal (e.g. emitter) of the BJT SB2-1, SB2-2, SB2-3. Although FIG. 5 uses the diodes D1-1, D1-2, D1-3, any electric components that are capable of conducting a current in one direction only and limiting current flow in the other direction can replace the diodes D1-1, D1-2, D1-3. For instance, as illustrated in FIG. 6, Metal-Oxide-Semiconductor Field-Effect Transistor (MOSFET) MB1, MB2, MB3 (e.g. N-channel MOSFET) can be used instead of the diodes D1-1, D1-2, D1-3.

In operation, when all of the ECUs 1 and 2 are disabled or failed (for instance all of invertors of the ECUs 1 and 2 are disabled or failed), voltages of the control signals CTL-1 and CTL-2 inputted from the ECUs 1 and 2 through the terminals C-1 and C-2 are at 0V. Then, the input terminals of the SSRs SB1-1, SB1-2, SB1-3 are at 0V. Because the SSRs SB1-1, SB1-2, SB1-3 are normally-closed devices and the input voltage of the SSRs SB1-1, SB1-2, SB1-3 is 0V, the SSRs SB1-1, SB1-2, SB1-3 are turned on (i.e. closed). This allows current flow from the motor 210 through the output terminals of the SSRs SB1-1, SB1-2, SB1-3. In turn, the current flowing through the SSRs SB1-1, SB1-2, SB1-3 to the bases of the BJTs SB2-1, SB2-2, SB2-3 turns on the BJTs SB2-1, SB2-2, SB2-3, and then the current from the motor 210 flows through the collector to emitter of the BJTs SB2-1, SB2-2, SB2-3 and returns to the motor phase terminals MP-1, MP-2, MP-3 through the diodes D1-1, D1-2, D1-3 of FIG. 5 (or the MOSFETs MB1, MB2, MB3 of FIG. 6) forming a return path for the current flowing from the motor 210 so that the motor phase terminals MP-1, MP-2, MP-3 can be shorted together. This results in the braking of the motor 210. The motor 210 may act as a brake and/or damper to oppose any motion applied to the motor 210.

However, if any one of the ECUs 1 and 2 is enabled, at least one of the control signals CTL1 and CTL2 received from the ECUs 1 and 2 through CT-1 and CT-2 is inputted into the first input terminals of the SSRs SB1-1, SB1-2, SB1-3, the input control signal CTL1 and/or CTL2 at a voltage which can turn off (i.e. open) the SSRs SB1-1, SB1-2, SB1-3. Then, in response to the voltage of the input control signal CTL1 and/or CTL2, the SSRs SB1-1, SB1-2, SB1-3 are turned off. This does not allow current flow to the bases of the BJTs SB2-1, SB2-2, SB2-3 and prohibits the BJTs SB2-1, SB2-2, SB2-3 from turning on. In turn, the motor phase terminals MP-1, MP-2, MP-3 are not shorted together, or the short status of the motor 210 is removed.

Therefore, when all invertors INV 1-1 to INV N-M of the ECUs 1 to N are disabled or failed, the shorting circuit 220 is configured to short the motor phase terminals MP-1 to MP-M connected to the motor windings 215-1 to 215-M so that the motor 210 can generate the braking torque. In the case that the motor 210 is included in the feedback actuator or steering feel actuator 28, the feedback actuator or steering feel actuator 28 may generate the braking torque to the steering wheel 20 and prevent from providing uncomfortable feeling of being separated from the road wheels to the driver or oversteering the vehicle by the driver when all or some electric control units of the feedback actuator or steering feel actuator 28 are disabled or failed.

Figure 7:
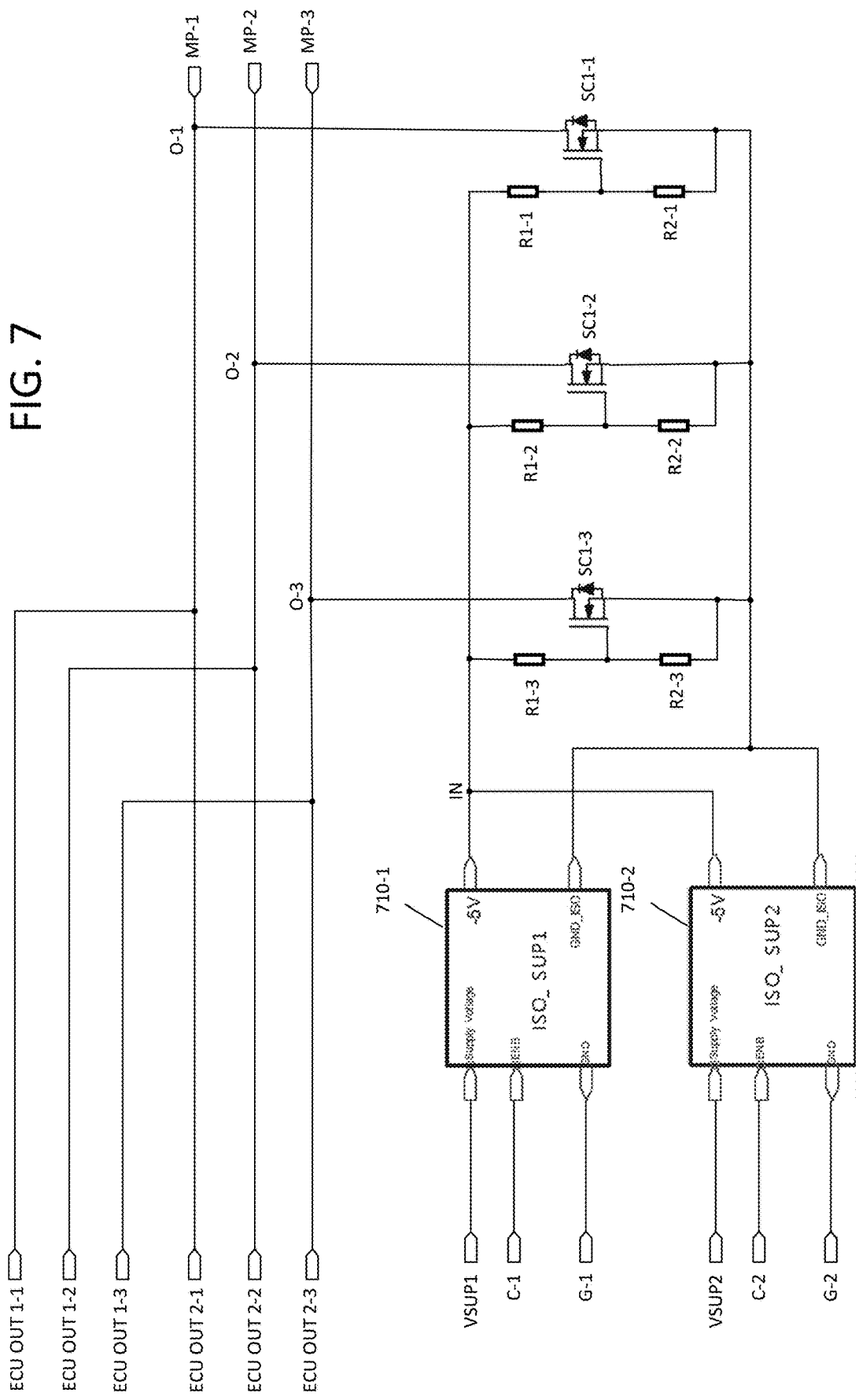

FIG. 7 is a conceptual circuit diagram of the shorting circuit 220 according to still another embodiment of the present disclosure.

The shorting circuit 220 may comprise a plurality of first switches SC1-1 to SC1-M. The first switches SC1-1 to SC1-M are connected to the motor phase terminals MP-1 to MP-N, respectively. For example, the switches SC1-1 to SC1-M are electrically connected between the motor phase terminals MP-1 to MP-M. The first switches SC1-1 to SC1-M are also electrically connected to the ECUs 1 to N through power supplies 710-1 to 710-N. The first switches SC1-1 to SC1-M are configured to receive an input signal IN associated with at least one of the control signals CTL-1 to CTL-N. In the embodiment illustrated in FIG. 7, the input signal IN is generated using the control signals CTL-1 to CTL-N by at least one of the power supplies 710-1 to 710-N, but it is not limited thereto. Alternatively, the input signal IN ma be, for example, but not limited to, the control signals CTL-1 to CTL-N themselves, any signal generated using the control signals CTL-1 to CTL-N (e.g. a signal generated by a charge pump, a negative voltage source, or an isolated power supply using at least one of the control signals CTL-1 to CTL-N), or any signal directly or indirectly related to at least one of the control signals CTL-1 to CTL-N.

The power supplies 710-1 to 710-N may be connected between the electric control units ECUs 1 to N and the first switches SC1-1 to SC1-M. For example, each of the power supplies 710-1 to 710-N is connected between a respective one of the electric control units ECUs 1 to N and the first switches SC1-1 to SC1-M. The power supplies 710-1 to 710-N receive power through terminals VSUP 1 to VSUP N. As shown in FIG. 2, the terminals VSUP 1 to VSUP N of the shorting circuit 220 may be connected to a respective one of the electric control units ECUs 1 to N to receive power. Alternatively, the terminals VSUP 1 to VSUP N of the shorting circuit 220 may be directly connected to the power sources 200-1 to 200-N of FIG. 2. Each of the power supplies 710-1 to 710-N is configured to supply a voltage to the first switches SC1-1 to SC1-M using the received power in response to a respective one of the control signals CTL-1 to CTL-N output from the electric control units ECUs 1 to N. The voltage supplied by the power supplies 710-1 to 710-N is capable of turning off the first switches SC1-1 to SC1-M. For example, when at least one of the power supplies 710-1 to 710-N receives one or more control signals CTL-1 to CTL-N from the corresponding electric control units ECUs 1 to N, the power supplies 710-1 to 710-N that receive the control signals CTL-1 to CTL-N supply the voltage to the first switches SC1-1 to SC1-M using the received power from the terminals VSUP 1 to VSUP N. However, when none of the power supplies 710-1 to 710-N receives any control signal CTL-1 to CTL-N from the corresponding electric control units ECUs 1 to N, the power supplies 710-1 to 710-N supply no voltage to the first switches SC1-1 to SC1-M.

The first switches SC1-1 to SC1-M may be turned on (i.e. closed) or turned off (i.e. open) in response to the input signal IN associated with the control signals CTL-1 to CTL-N in order to cause the motor phase terminals MP-1 to MP-N to be selectively shorted. For example, the first switches SC1-1 to SC1-M are normally turned on, and are turned off when receiving the input signal at a voltage which is more than a threshold (or less than the threshold). When receiving no input signal IN or an input signal at 0V from the power supplies 710-1 to 710-N, the first switches SC1-1 to SC1-M may be turned on (i.e. closed), and the motor phase terminals MP-1 to MP-M electrically connected by the first switches SC1-1 to SC1-M may be shorted together. However, when the first switches SC1-1 to SC1-M receive the input signal IN from any one of the power supplies 710-1 to 710-N, the first switches SC1-1 to SC1-M are turned off, and the first switches SC1-1 to SC1-M may not short the motor phase terminals MP-1 to MP-M or may remove the short of the motor phase terminals MP-1 to MP-M. The number of the first switches SC1-1 to SC1-M may correspond to the number of the phases of the motor 210. For instance, in the embodiment of FIG. 7, because the motor 210 is a three-phase motor, the shorting circuit 220 has three (3) first switches SC1-1, SC1-2, SC1-3. However, the shorting circuit 220 may have a different number of the first switches SC1-1 to SC1-M from the number of the phases of the motor 210. The number of the power supplies 710-1 to 710-N may correspond to the number of the electric control units ECUs 1 to N or the power sources 200-1 to 200-N. However, the shorting circuit 220 may have a different number of the power supplies 710-1 to 710-N from the number of the electric control units ECUs 1 to N or the power sources 2004 to 200-N.

For illustration purposes, in this exemplary embodiment shown in FIG. 7, the motor 210 is shown as a three-phase motor having phases U, V, W and two (2) ECUs, ECU 1 and ECU 2, are connected with the shorting circuit 220 and two (2) power supplies 7104 and 710-2 are provided. However, the present disclosure is not limited thereto.

In the exemplary embodiment illustrated in FIG. 7, the first switches SC1-1, SC1-2, SC1-3 are normally closed switches (for example depletion mode Metal-Oxide-Semiconductor Field-Effect Transistors MOSFETs)). In the embodiment of FIG. 7, the first switches SC1-1, SC1-2, SC1-3 are illustrated as N-type MOSFETs for illustration purposes only. However, one skilled in the art will recognize that other transistor types including P-type MOSFETs could be used instead of the N-type MOSFETs shown in this illustrative example, the substitution could be made to replace the N-type MOSFETs with P-type MOSFETs, and change or add appropriate connections and/or electric components. Further, any switch, such as a transistor, which is turned off when a voltage between a first terminal of the switch and a second terminal of the switch is below (or above) a threshold and is turned off when the voltage between the first terminal of the switch and the second terminal of the switch is above (or below) the threshold, can be used instead of the MOSFETs.

The input signal IN associated with the control signals CTL-1 and CTL-2 are provided to first terminals (e.g. gates) of the MOSFETs SC1-1, SC1-2, SC1-3. Second terminals (e.g. sources) of the MOSFETs SC1-1, SC1-2, SC1-3 are connected to each other and/or ground terminals of the power supplies 710-1 and 710-2. A third terminal (e.g. drain) of the MOSFET SC1-1 is connected to a U-phase motor terminal MP-1 connected to the motor winding 215-1, a third terminal (e.g. drain) of the MOSFET SC1-2 is connected to a V-phase motor terminal MP-2 connected to the motor winding 215-2, and a third terminal (e.g. drain) of the MOSFET SC1-3 is connected to a W-phase motor terminal MP-3 connected to the motor winding 215-3.

First resistors R1-1, R1-2, R1-3 may be coupled between an output terminal of the power supplies 710-1 and 710-2 outputting the input signal IN and the first terminals (e.g. gates) of the MOSFETs SC1-1, SC1-2, SC1-3. The first resistors R1-1, R1-2, R1-3 may be configured to provide gate resistance to limit a gate inrush current.

Second resistors R2-1, R2-2, R2-3 (e.g. pull down resistors) may be coupled between the first terminals (e.g. gates) and second terminals (e.g. sources) of the MOSFETs SC1-1, SC1-2, SC1-3. The second resistors R2-1, R2-2, R2-3 may be configured to pull down to turn on the MOSFETs SC1-1, SC1-2, SC1-3 when no voltage is supplied to the first terminals (e.g. gates) of the MOSFETs SC1-1, SC1-2, SC1-3.

In operation, when all of the ECUs 1 and 2 are disabled or failed (for instance all of invertors of the ECUs 1 and 2 are disabled or failed), voltages of the control signals CTL 1 and CTL 2 inputted from the ECUs 1 and 2 through the terminals C-1 and C-2 are at 0V. Then, the power supplies 710-1 and 710-2 provide no input signal IN or an input signal IN at 0V to the gates of the MOSFETs SC1-1, SC1-2, SC1-3. Because the gate-source voltage of the MOSFETs SC1-1, SC1-2, SC1-3 is 0V and the MOSFETs SC1-1, SC1-2, SC1-3 are normally-on devices, the MOSFETs SC1-1, SC1-2, SC1-3 are turned on (i.e. closed) and short the motor phase terminals MP-1, MP-2, MP-3. This results in the braking of the motor 210. The motor 210 may act as a brake and/or damper to oppose any motion applied to the motor 210

However, if any one of the ECUs 1 and 2 is enabled, the power supplies 710-1 and 710-2 receive at least one of the control signals CTL1 and CTL2 inputted from the ECUs 1 and 2 through CT-1 and CT-2. The power supplies 710-1 and 710-2 which receive the control signals CTL 1 and CTL 2 generate the input signal IN at a voltage that is capable of turning off the MOSFETs SC1-1, SC1-2, SC1-3, for example, but not limited to, −5V. This makes the gate-source voltages of the MOSFETs SC1-1, SC1-2, SC1-3 below threshold voltages of the MOSFETs SC1-1, SC1-2, SC1-3. In turn, the MOSFETs SC1-1, SC1-2, SC1-3 are turned off and does not short the motor phase terminals MP-1, MP-2, MP-3 or remove the motor 210 from the short status.

Therefore, when all invertors INV 1-1 to INV N-M of the ECUs 1 to N are disabled or failed, the shorting circuit 220 is configured to short the motor phase terminals MP-1 to MP-M connected to the motor windings 215-1 to 215-M so that the motor 210 can generate the braking torque. In the case that the motor 210 is included in the feedback actuator or steering feel actuator 28, the feedback actuator or steering feel actuator 28 may generate the braking torque to the steering wheel 20 and prevent from providing uncomfortable feeling of being separated from the road wheels to the driver or oversteering the vehicle by the driver when all or some electric control units of the feedback actuator or steering feel actuator 28 are disabled or failed.

Figure 8:
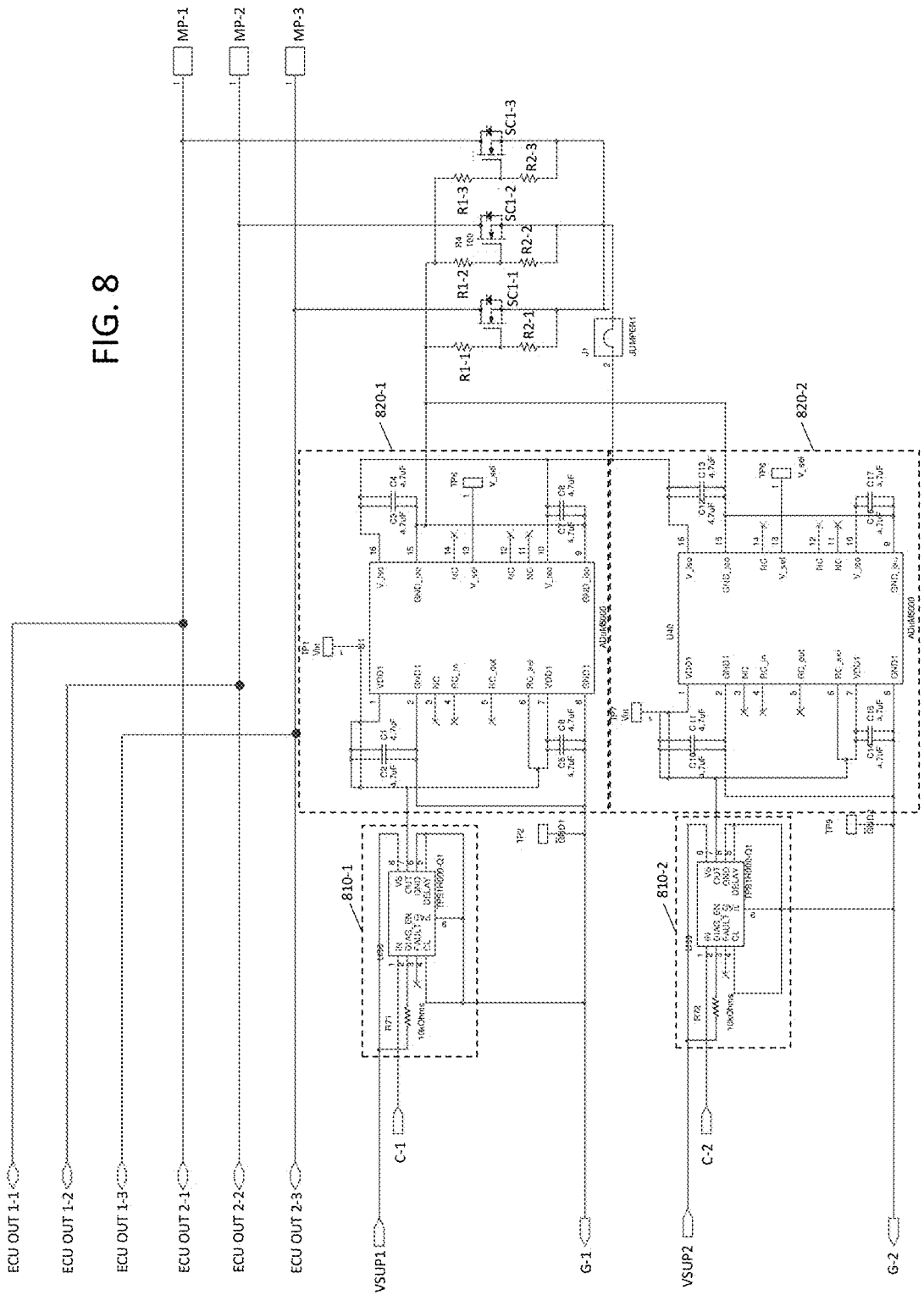

In another exemplary embodiment illustrated in FIG. 8, second switches 810-1 and 810-2 and isolated power supplies 820-1 and 820-2 ma replace the power supplies 710-1 and 710-2 of FIG. 7. Each of the second switches 810-1 and 810-2 may be configured to receive a respective one of the control signals CTL 1 and CTL 2 inputted from the ECUs 1 and 2 through CT-1 and CT-2 and the power from a respective one of from the terminals VSUP 1 and VSUP 2. Each of the second switches 810-1 and 810-2 may be configured to output the power to a respective one of isolated power supplies 820-1 and 820-2 in response to a respective one of the control signals CTL 1 and CTL 2. Each of the isolated power supplies 820-1 and 820-2 may be configured to supply a voltage, which is capable of turning off the MOSFETs SC1-1, SC1-2, SC1-3, to the MOSFETs SC1-1, SC1-2, SC1-3 using the power received from a respective one of the second switches 810-1 and 810-2.

In some embodiments of the present disclosure, the motor for the feedback actuator or steering feel actuator is described, but the present disclosure is not limited thereto. However, one skilled in the art will recognize that the motor control system according to the present disclosure could be applied to or used with any motor that requires braking and/or damping torque.

Although the example embodiments have been described in detail, it should be understood that various changes, substitutions and alterations can be made herein without departing from the spirit and scope of the application as defined by the appended claims.

In the present disclosure, relational terms such as first and second, and the like may be used solely to distinguish one entity or action from another entity or action without necessarily requiring or implying any actual such relationship or order between such entities or actions. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements. The term "connected" or "coupled" may mean direct or indirect connection unless otherwise specified.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:
1. A motor control system, comprising:
  a motor comprising a plurality of motor phase terminals;
  a plurality of electric control units electrically connected with the motor and configured to control the motor, wherein the electric control units are configured to output control signals, respectively; and
  a shorting circuit connected to between the motor and the electric control units, the shorting circuit configured to short the motor phase terminals in response to receiving none of the control signals from the electric control units, wherein:
  the shorting circuit is configured not to short the motor phase terminals when receiving at least one of the control signals from at least one of the electric control units, and
  wherein the shorting circuit comprises a plurality of first switches, wherein the first switches are connected between the motor phase terminals, the first switches configured to connect the motor phase terminals together in response to receiving none of the control signals output from the electric control units so that the motor phase terminals are shorted together in response to receiving none of the control signals output from the electric control units.

2. The system of claim 1, wherein the shorting circuit comprises:
  first switches electrically connected with the electric control units, wherein the first switches are configured to be turned on or off in response to at least one of the control signals output from the electric control units or one or more input signals associated with the control signals; and
  second switches, wherein each of the second switches is electrically connected with a respective one of the first switches, and the second switches are configured to be turned on or off in response to the turned on or off of the first switches to selectively short the motor phase terminals.

3. The system of claim 2, wherein the first switches are configured to be turned on in response to receiving none of the control signals of the electric control units, and the second switches are configured to be turned on in response to the turned on of the first switches so that the motor phase terminals are shorted together through the second switches.

4. The system of claim 2, wherein the first switches are configured to be turned off in response to receiving at least one of the control signals of the electric control units, and the second switches are configured to be turned off in response to the turned off of the first switches so that the motor phase terminals are not shorted through the second switches.

5. The system of claim 2, wherein the shorting circuit further comprises electric components connected with the second switches, respectively, and configured to conduct a current, flowing from the motor through the second switches, in only one direction to form a return path for the current flowing from the motor.

6. The system of claim 2, wherein the shorting circuit further comprises electric components configured to conduct a current, flowing from the motor through the second switches, in only one direction to form a return path for the cuneni flowing from the motor,
wherein the electric components are connected with the second switches in parallel, respectively.

7. The system of claim 2, further comprising a voltage supply circuit connected between the electric control units and the first switches of the shorting circuit, the voltage supply circuit configured to supply voltage to the first switches using the control signals so that the voltage supplied using the control signals turns off the first switches not to short the motor phase terminals together.

8. The system of claim 1, wherein the shorting circuit comprises:
junction gate field-effect transistors (JFETs) electrically connected with the electric control units, the JFETs configured to be turned on or off in response to at least one of the control signals of the electric control units or one or more input signals associated with the control signals; and
bipolar junction transistors (BJTs) electrically connected with the JFETs, respectively, the BJTs configured to be turned on or off in response to the turned on or off of the JFETs to selectively short the motor phase terminals.

9. The system of claim 1, wherein the shorting circuit comprises:
JFET having a first terminal configured to receive at least one of the control signals of the electric control units or an input signal associated with the at least one of the control signals, a second terminal, and a third terminal connected to between one of the motor phase terminals and one of the electric control units and
a BJT having a first terminal connected to the third terminal of the JFET, a second terminal, and a third terminal connected to between the one of the motor terminals and the one of the electric control units.

10. The system of claim 9, wherein the shorting circuit further comprises a diode connected with the BiT in parallel, the diode having first and second terminals, wherein the first terminal of the diode is connected to the third terminals of the JFET and the BST connected to between the one of the motor phase terminals and the one of the electric control units, and the second terminal of the diode is connected to the second terminal of the BST.

11. The system of claim 9, wherein the shorting circuit further comprises a metal-oxide-semiconductor field-effect transistor (MOSFET) connected with the BJT in parallel, the MOSFET having first, second and third terminals, wherein the first terminal of the MOSFET is connected to the third terminals of the JFET and the BJT connected to between the one of the motor phase terminals and the one of the electric control units, and the second and third terminals of the MOSFET are connected to the second terminal of the BJT.

12. The system of claim 1, wherein the shorting circuit comprises:
solid state relays (SSRs) electrically connected with the electric control units, the SSRs configured to be turned on or off in response to at least one of the control signals output from the electric control units, and
bipolar junction transistors (BJTs) electrically connected with the SSRs, respectively, the BJTs configured to be turned on or off in response to the aimed on or off of the SSRs io selectively short the motor phase terminals.

13. The system of claim 12, wherein:
the SSRs are configured to be normally closed, and to be opened when receiving the at least one of the control signals output from the electric control units, and
the BJTs are configured to be turned on when the SSRs are closed so that the motor phase terminals are shorted together, and to be turned off when the SSRs are opened by receiving the at least one of the control signals output from the electric control units.

14. The system of claim 1, wherein:
the shorting circuit comprises SSRs and BJTs,
at least one of the SSRs has a first terminal connected to between one of the motor phase terminals and one of the electric control units, a second terminal configured to receive at least one of the control signals output from the electric control units, and a third terminal connected to one of the BJTs, and
at least one of the BJTs has a first terminal connected to between the one of the motor phase terminals and the one of the electric control units, and a second terminal connected to the at least one of the SSRs, and a third terminal connected to other BJTs.

15. The system of claim 14, wherein the shorting circuit further comprises diodes connected with the BJTs in parallel, respectively, each of the diodes having first and second terminals, wherein the first terminal of at least one of the diodes is connected to the first terminals of the at least one of the SSRs and the at least one of the BiTs connected to between the one of the motor terminals and the one of the electric control units, and the second terminal of the at least one of the diodes is connected to the third terminal of the at least one of the BJTs.

16. The system of claim 14, wherein the shorting circuit further comprises MOSFETs connected with the BM in parallel, respectively, each of the MOSFETs having first, second and third terminals, wherein the first terminal of at least one of the MOSFETs is connected to the first terminals of the at least one of the SSRs and the at least one of the BITs connected to between the one of the motor phase terminals and the one of the electric control units, and the second and third terminals of the at least one of the MOSFETs are connected to the third terminal of the at least one of the BJTs.

17. The system of claim 1, further comprising a plurality of power supplies connected between the electric control units and the first switches, and the power supplies are connected with one or more power sources or connected to a respective one of the electric control units to receive power, wherein each of the power supplies is configured to supply a voltage, which is capable of turning off the first switches, to the first switches using the received power in response to a respective one of the control signals output from the electric control units.

18. The system of claim 1, further comprising:

a plurality of second switches configured to receive a respective one of the control signals from a respective one of the electric control units, and power from one or more power sources or the respective one of the electric control units and to output the power in response to the respective one of the control signals; and a plurality of isolated power supplies, each of the isolated power supplies configured to supply a voltage, which is capable of turning off the first switches, to the first switches using the power received from a respective one of the second switches, wherein a respective one of the isolated power supplies is connected between a respective one of the first switches and the respective one of the second switches.

\* \* \* \* \*